United States Patent [19]

Berkhan

[11] 3,864,212

[45] Feb. 4, 1975

[54] TREATMENT OF CELLS FOR MEASUREMENT OF DNA

[75] Inventor: Ernst Berkhan, Gottingen, Germany

[73] Assignee: Phywe Aktiengesellschaft, Gottingen, Germany

[22] Filed: May 25, 1972

[21] Appl. No.: 256,822

[30] Foreign Application Priority Data
May 25, 1971 Germany............................ 2125699

[52] U.S. Cl. ............. 195/103.5 R, 195/2, 23/230 B
[51] Int. Cl. .............................................. C12k 1/00
[58] Field of Search ............ 195/103.5 R; 23/230 B

[56] References Cited
UNITED STATES PATENTS
3,586,859   6/1971   Katz............................ 195/103.5 R
3,741,875   6/1973   Ansley et al. ................ 195/103.5 R

OTHER PUBLICATIONS

Ginzburg-Teitz et al., "Brochim. Biophys. Acta," 134-211-14 (1967).

"Chemical Abstracts," 52:15667h (1958).

Miller, "Clinical Pathology," 7th Ed. (1966) p. 840-841.

Stoneburg et al., Am. J. Cancer, Vol. 38, pages 377-379 (1940).

Primary Examiner—Alvin E. Tanenholtz
Attorney, Agent, or Firm—Roylance, Abrams, Berdo & Kaul

[57] ABSTRACT

Treatment of cells for measurement of DNA therein. Initially the nuclei of the cells are isolated which can be done by treatment with a solution of pepsin in hydrochloric acid. The isolated nuclei are suitably washed and are then dyed in a dye solution which takes specific effect on nucleic acids.

3 Claims, 3 Drawing Figures

TREATMENT OF CELLS FOR MEASUREMENT OF DNA

BACKGROUND AND NATURE OF THE INVENTION

For many biological and medical tests it is necessary to measure the amount of Desoxyribonucleic acid (DNA) in cell nuclei. It is most usual for this purpose to measure the absorption of ultraviolet radiation by the DNA, or to measure visible light absorption or fluorescence caused by deposition of certain dyes on the DNA (Feulgen reaction). Certain cytophotometers are used for this purpose.

For these purposes according to known procedures the cells are affixed to the surface of a glass plate, are suitably dyed, and individually located by the microscope which then is focused for the optical measurements. Such procedures require several minutes per cell so that it is impossible by such a procedure to perform measurements with respect to larger cell populations.

Substantial progress was achieved by novel flow-through procedures, wherein the cells, as a suspension in optically empty liquid, flow through a measuring chamber of fixed dimensions. The arrangement of the chamber is such that the optical measurements can be performed therein, automatically, with respect to several thousand cells per second. These measurements have been made primarily by means of fluorescence methods.

It has become possible thereby to analyze a cell population with regard to distribution of DNA amounts, in short times and with high statistical accuracy. Malignant degeneration of a cell population, with changed kinetics or proliferation could be recognized thereby and thus it became possible to review many extremely important problems in cancer diagnosis and therapy.

The Feulgen reaction used for specific and quantitative dying comprises hydrolysis of the DNA by hydrochloric acid, whereby aldehyde groups are formed, and a reaction of the aldehyde groups with a Schiff reagent, an aqueous solution of dyes which are decolorized by sulfur dioxide. The preferred dyes have been fuchsin for absorption measurements and acridine dyes for fluorescence.

In those procedures the hydrolysis was used as a reaction with specific effect on the DNA; however, it was hard to control the hydrolysis. Even small changes in duration and temperature of the reaction or in concentration of the acid, produced results which could not be utilized. Particularly the results of hydrolysis were dependent on the type and age of the cells If no use was made of hydrolysis and the cells were dyed directly with a fluorescent dye this generally resulted in the dyeing of various contents of cells, in addition to the DNA. It then became impossible to quantitatively determine the DNA.

Thus, it is the object of this invention to provide a method of controlled dyeing of only the DNA of cells and thus to avoid the above mentioned drawbacks of the earlier methods.

This is achieved by isolating the cell nucleus from the cell prior to the dyeing, whereupon this cell nucleus can be dyed and measured. The method utilizes the fact that the DNA of the cell is primarily concentrated in the cell nucleus (more than 99%) while the other dye-absorbing cell contents, such as ribonucleic acids, are concentrated in the cell plasma.

DRAWINGS

The new measuring process comprises: initially, isolating the cell nuclei from the other cell contents, advantageously by applying a solution of pepsin in hydrochloric acid to the cells; thereafter separating the nuclei from this solution to isolate them from the plasma and the like; and then dyeing the separated nuclei and thereby their nuclear acid constituents in a dye solution effective for the dyeing of nuclear acids. The solution can be of a type known by itself.

Preferably the isolated and dyed nuclei then are suspended in an optically empty liquid and the suspension is passed through a through-flow chamber for photoelectric or other observation.

EXAMPLE

The cells are incubated for 15 minutes in a solution of 0.2 grams pepsin in 100 ml. 0.2% hydrochloric acid at 37°C. The nuclei are isolated with the aid of this treatment, and are not impaired thereby in their susceptibility to the dye. They are then washed in surgical standard common salt solution and are thereafter dyed in a dye solution of ethidium bromide, applied in a way known by itself.

SECOND EXAMPLE

The same procedure is used for separating the nuclei as in the first Example. The nuclei then are similarly dyed with acridine orange.

THIRD EXAMPLE

The same procedure for isolating the nuclei. The isolated nuclei then are dyed with Coriphosphin.

Results

Figure 1:
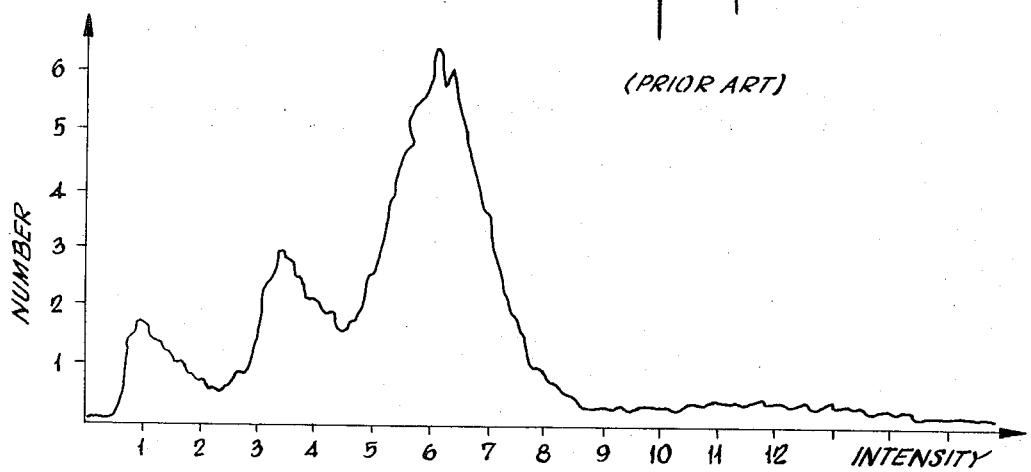
FIG. 1 shows results of a prior art method of measuring DNA in certain cells.
Figure 2:
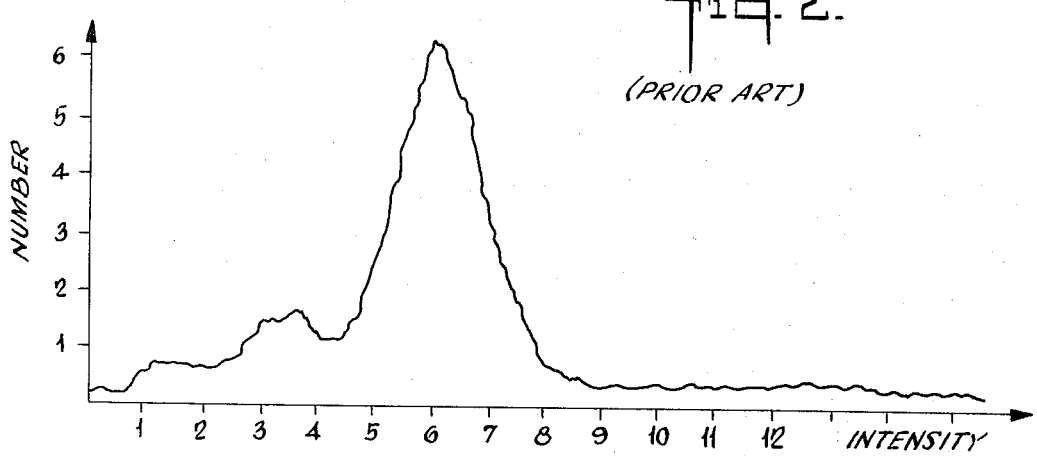
FIG. 2 shows results of another prior art method.

The measurement of FIGS. 1 to 2 were obtained by the conventional, cytophotometric scribing of fluorescence results, after one of the dyes was applied to complete epithelium cells from the vagina.

Results of FIG. 1 show fluorescence, measured after conventional Feulgen dyeing with acriflavin; FIG. 2 shows it after conventional dyeing with ethidium bromide. As shown, a multiplicity of peaks of fluorescence resulted, in both cases, reaching maximum at 4 6/7 of the abcissa. Such results are useless for studies of the desired kind.

Figure 3:
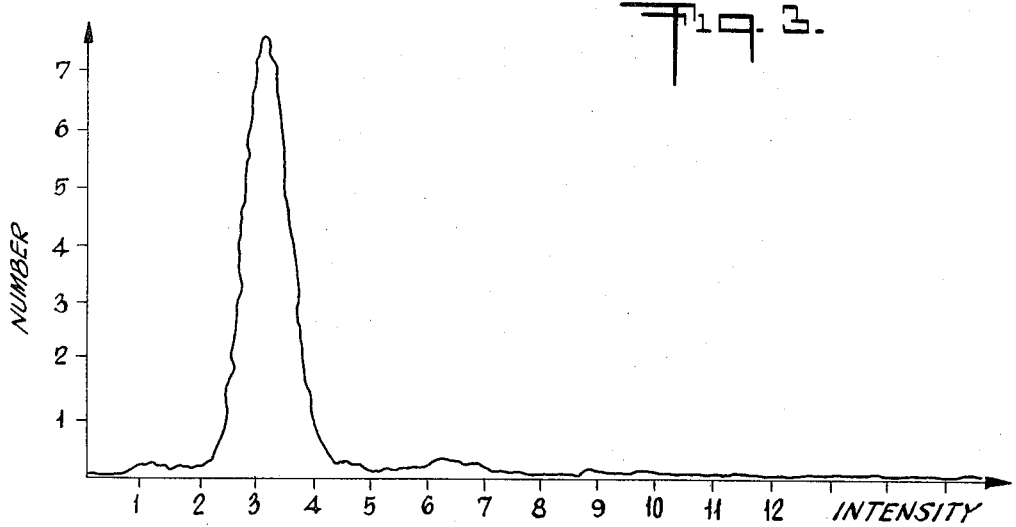
FIG. 3 shows results of the new method.

FIG. 3 shows the corresponding measurement, obtained according to the new method, where first the cell nuclei were pepsin-separated and then the same acriflavin dye was applied to the separated nuclei. A single sharp peak of fluorescence resulted. It reached a precise and sharply resolvable maximum at a single position between 3 and 4, as needed for the diagnosis of cancer.

Incidentally, the new method is unusually rapid. It can be performed in 30 minutes, while corresponding, conventional measurements with Feulgen dyeing require 2 hours. The new method also is more reproducible than the earlier ones.

What is claimed is:

1. A treatment of cells for measurement of DNA therein comprising: initially isolating the nuclei of the cells by separating them from the cell plasma, then dyeing the isolated nuclei in a dye solution which takes specific effect on nucleic acids and causes fluorescence, and measuring the intensity of fluorescence caused by said dyes by passing a liquid suspension of the dyed nuclei through a flow-through optical measuring chamber.

2. A treatment of cells according to claim 1 additionally including suspending the isolated, dyed nuclei in an optically empty liquid.

3. A treatment of cells for measurement of DNA therein comprising: initially isolating the nuclei of the cells by treating the cells with a solution of pepsin in hydrochloric acid and thereafter separating them from the solution and from the cell plasma, then dyeing the isolated nuclei in a dye solution which takes effect on nucleic acids and causes fluorescence, and measuring the intensity of fluorescence caused by said dyes by passing a liquid suspension of said dyed nuclei through a flow-through optical measuring chamber.

* * * * *